United States Patent
Park et al.

(10) Patent No.: US 11,355,773 B2
(45) Date of Patent: Jun. 7, 2022

(54) FUEL CELL STACK

(71) Applicant: LG CHEM, LTD., Seoul (KR)

(72) Inventors: Sanghyun Park, Daejeon (KR); Kwangwook Choi, Daejeon (KR); Sanghyeok Im, Daejeon (KR); Tai Min Noh, Daejeon (KR); Kwangyeon Park, Daejeon (KR); Daehwan Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/609,670

(22) PCT Filed: Jul. 2, 2018

(86) PCT No.: PCT/KR2018/007481
§ 371 (c)(1),
(2) Date: Oct. 30, 2019

(87) PCT Pub. No.: WO2019/013483
PCT Pub. Date: Jan. 17, 2019

(65) Prior Publication Data
US 2020/0153022 A1 May 14, 2020

(30) Foreign Application Priority Data
Jul. 13, 2017 (KR) ........................ 10-2017-0088978

(51) Int. Cl.
*H01M 8/248* (2016.01)
*H01M 8/0276* (2016.01)
(Continued)

(52) U.S. Cl.
CPC ......... *H01M 8/248* (2013.01); *H01M 8/0276* (2013.01); *H01M 8/0282* (2013.01); *H01M 8/247* (2013.01)

(58) Field of Classification Search
CPC .... H01M 8/248; H01M 8/0276; H01M 8/247; H01M 8/0282
See application file for complete search history.

(56) References Cited

U.S. PATENT DOCUMENTS 9,608,283 B2   3/2017   Choi et al.
10,008,732 B2  6/2018   Choi et al.
(Continued)

FOREIGN PATENT DOCUMENTS

CN   104737348 A   6/2015
JP   9-92323 A     4/1997
(Continued)

OTHER PUBLICATIONS

International Sesrch Report (PCT/ISA/210) issued in PCT/KR2018/007481, dated Oct. 16, 2018.

*Primary Examiner* — Milton I Cano
*Assistant Examiner* — Jenna Shulman
(74) *Attorney, Agent, or Firm* — Birch, Stewart, Kolasch & Birch, LLP

(57) ABSTRACT

A fuel cell stack has a prevention dam formed outside an alignment pin, such that a sealing material, which has viscosity and fluidity at a sealing temperature of a fuel cell, may be prevented from coming into contact with and adhering to the alignment pin, and pressure applied from the outside may be uniformly applied to the fuel cell stack.

8 Claims, 2 Drawing Sheets

(51) Int. Cl.
    *H01M 8/0282* (2016.01)
    *H01M 8/247* (2016.01)

(56) References Cited

U.S. PATENT DOCUMENTS

| | | | |
|---|---|---|---|
| 10,256,495 | B2 | 4/2019 | Hotta et al. |
| 2009/0311570 | A1 | 12/2009 | Chou et al. |
| 2015/0221970 | A1 | 8/2015 | Wilson et al. |
| 2015/0263372 | A1* | 9/2015 | Choi .................... H01M 8/247 429/465 |
| 2016/0372778 | A1 | 12/2016 | Hotta et al. |

FOREIGN PATENT DOCUMENTS

| | | | |
|---|---|---|---|
| JP | 2007-66625 | A | 3/2007 |
| JP | 2008-52943 | A | 3/2008 |
| JP | 2011-76890 | A | 4/2011 |
| JP | 2013-55042 | A | 3/2013 |
| JP | 2016-126833 | A | 7/2016 |
| JP | 6013006 | B2 | 10/2016 |
| JP | 6054912 | B2 | 12/2016 |
| KR | 10-2014-0087188 | A | 7/2014 |
| KR | 10-2015-0001402 | A | 1/2015 |
| KR | 10-1479682 | B1 | 1/2015 |
| KR | 10-2015-0027904 | A | 3/2015 |

\* cited by examiner

[Figure 1]
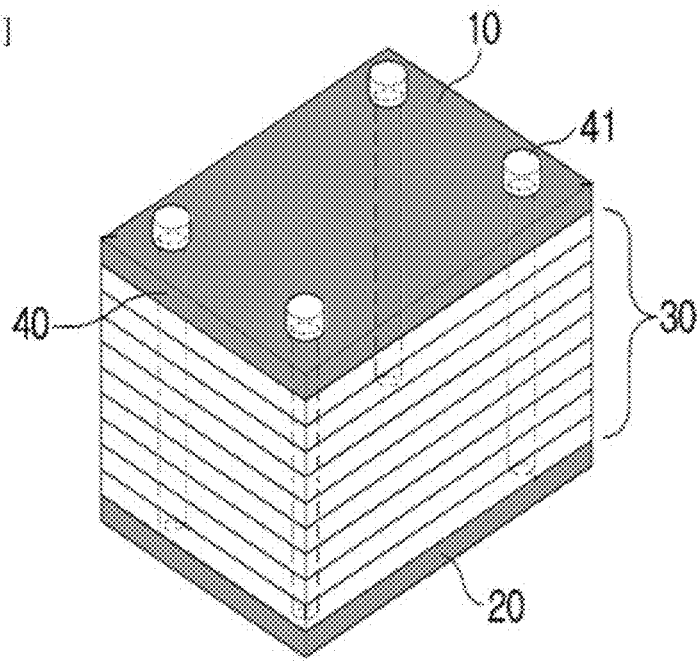
[Figure 2]
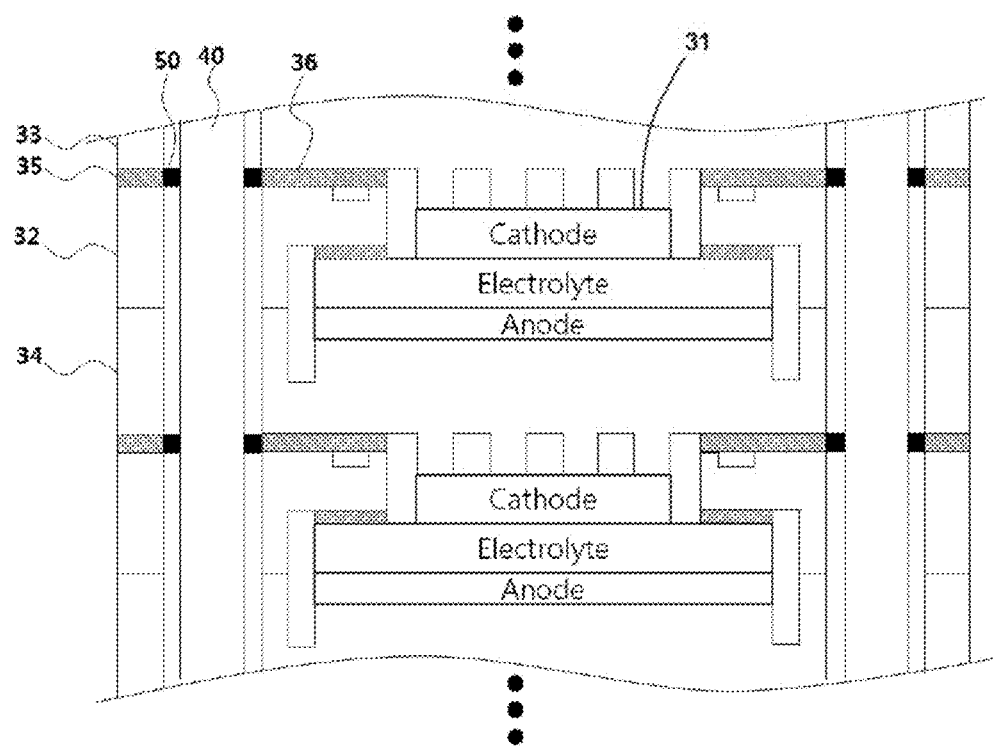

[Figure 3]
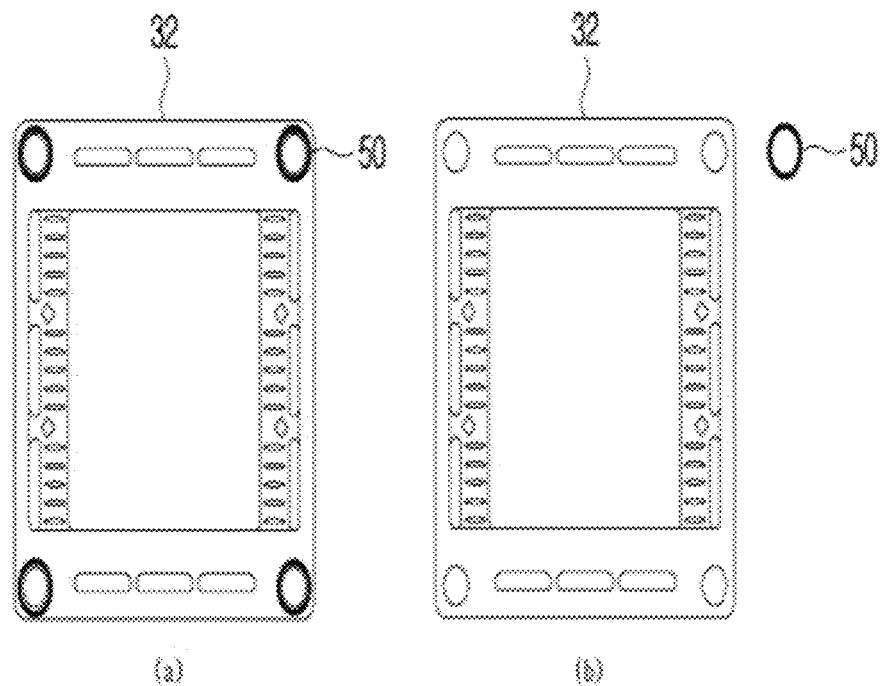

FUEL CELL STACK

TECHNICAL FIELD

This application claims priority to and the benefit of Korean Patent Application No. 10-2017-0088978 filed in the Korean Intellectual Property Office on Jul. 13, 2017, the entire contents of which are incorporated herein by reference.

The present invention relates to a fuel cell stack, and more particularly, to a fuel cell stack in which a prevention dam is formed outside an alignment pin, such that a sealing material, which has viscosity and fluidity at a sealing temperature of a fuel cell, may be prevented from coming into contact with and adhering to the alignment pin, and pressure applied from the outside may be uniformly applied to the fuel cell stack.

BACKGROUND ART

In general, a fuel cell refers to a power generation system which converts energy, which is produced by a chemical reaction between oxygen or oxygen-containing air and hydrogen contained in a hydrocarbon-based material, directly into electrical energy.

For example, a solid oxide fuel cell has a structure in which multiple electricity producing units, which include unit batteries and separators and produce electricity through oxidation/reduction reactions of hydrogen and oxygen, are stacked. The unit battery includes an electrolyte membrane, a positive electrode (air electrode) which is positioned at one side of the electrolyte membrane, and a negative electrode (fuel electrode) which is positioned at the other side of the electrolyte membrane.

When oxygen is supplied to the positive electrode and hydrogen is supplied to the negative electrode, oxygen ions, which are produced by a reduction reaction of oxygen at the positive electrode, are moved to the negative electrode through the electrolyte membrane, and then react with hydrogen supplied to the negative electrode, and water is produced. In this case, during a process in which electrons created at the negative electrode are delivered to the positive electrode and consumed, the electrons flow to an external circuit, and the unit battery produces electrical energy by using the flow of the electrons.

One unit battery and separators positioned at both sides of the unit battery constitute one unit cell. An operating voltage of the unit cell is typically lower than 1.0 V, and thus the operating voltage of the unit cell is insufficient for industrial applications. Therefore, to increase the voltage in the fuel cell, multiple unit cells are stacked so that the multiple unit cells are electrically connected to one another in series, thereby forming a stack.

Here, the stack may include one or more unit cells, interconnectors, window frames, and spacers, and the respective constituent elements may be coupled by fastening members. Further, a sealing material is positioned between the respective constituent elements, that is, between the unit cells, the interconnectors, and the window frames, thereby bonding the respective constituent elements. Predetermined pressure may be applied to the stack at a sealing temperature in order to bond the respective constituent elements.

The sealing material may have viscosity and fluidity at the sealing temperature, and thus when pressure is applied to the stack in the related art at the sealing temperature, the sealing material having fluidity is pushed out of a stack structure by external pressure and may come into contact with and adhere to the fastening member. Therefore, the fuel cell stack in the related art has a problem in that the external pressure cannot be uniformly applied due to the adhesion between the sealing material and the fastening member, and as a result, there is a problem in that a volume of the fuel cell stack may be increased, an output may deteriorate, and damage may occur.

Therefore, the present inventors have developed a fuel cell stack capable of preventing an alignment pin and a sealing material from coming into contact with and adhering to each other at a sealing temperature in order to solve the aforementioned problems of the fuel cell stack in the related art.

DETAILED DESCRIPTION OF THE INVENTION

Technical Problem

The present invention has been made in an effort to solve the aforementioned problems, and an object of the present invention is to provide a fuel cell stack in which a prevention dam is formed outside an alignment pin, such that a sealing material and the alignment pin are prevented from coming into contact with and adhering to each other when applying pressure to the fuel cell stack at a sealing temperature.

Another object of the present invention is to provide a fuel cell stack in which a sealing material and an alignment pin do not adhere to each other, such that pressure applied from the outside of the fuel cell stack is uniformly applied along a surface of the fuel cell stack.

Technical Solution

A fuel cell stack according to an exemplary embodiment of the present invention includes: an upper end plate; a lower end plate; a stack structure which is positioned between the upper and lower end plates and includes one or more end cells which are stacked; an alignment pin which connects the upper end plate, the lower end plate, and the stack structure; and a prevention dam which surrounds an outer portion of the alignment pin.

In the exemplary embodiment, the end cell may include: a unit cell; a window frame which is positioned at an upper side of the unit cell; interconnectors which are positioned at an upper side of the window frame and a lower side of the unit cell; a sealing material which is positioned between the unit cell, the window frame, and the interconnector and bonds the unit cell, the window frame, and the interconnector; and a spacer which is positioned at an upper side of the window frame and transmits a load to the sealing material, and a height of the prevention dam may be equal to a height of the spacer.

In the exemplary embodiment, in the fuel cell stack, one or more holes may be formed at edges of the upper end plate, the lower end plate, and the stack structure, and a cross-sectional area of the prevention dam may be larger than a cross-sectional area of the hole.

In the exemplary embodiment, the prevention dam may be made of mica or insulating ceramics.

In the exemplary embodiment, the prevention dam may be made of metal.

In the exemplary embodiment, the prevention dam may have a hollow column shape.

In the exemplary embodiment, the prevention dam may have a cross section and a plane having a shape selected from a group consisting of a circular shape, an elliptical shape, a polygonal shape having vertices with curvatures, a triangular shape, a quadrangular shape, a pentagonal shape, and a hexagonal shape.

Advantageous Effects

According to the present invention, one or more prevention dams having a hollow column shape are stacked outside the alignment pin, such that it is possible to prevent the sealing material, which has fluidity at the sealing temperature, and the alignment pin from coming into contact with and adhering to each other.

In addition, according to the present invention, since the sealing material and the alignment pin do not come into contact with nor adhere to each other, pressure is uniformly applied to the fuel cell stack when compressing and bonding the fuel cell stack at the sealing temperature, such that it is possible to improve leakproof sealability of the configuration of the fuel cell stack and prevent deterioration in output of the fuel cell and damage to the fuel cell.

BRIEF DESCRIPTION OF DRAWINGS

FIG. 1 is a perspective view illustrating a fuel cell stack according to an exemplary embodiment of the present invention.

FIG. 2 is a partial cross-sectional view of the cell stack illustrated in FIG. 1.

FIGS. 3A and 3B are top plan views illustrating a window frame and prevention dams according to the exemplary embodiment of the present invention, in which FIG. 3A is a top plan view illustrating a state in which the prevention dams are stacked on upper portions of holes of the window frame, and FIG. 3B is a top plan view illustrating a state in which the prevention dam is separated from the window frame.

BEST MODE

Hereinafter, the present invention will be described in detail with reference to the accompanying drawings. Here, repeated descriptions, and detailed descriptions of publicly known functions and configurations will be omitted so as to avoid unnecessarily obscuring the subject matter of the present invention. Exemplary embodiments of the present invention are provided to completely explain the present invention to a person with ordinary skill in the art. Therefore, shapes and sizes of elements illustrated in the drawings may be exaggerated for a more apparent description.

Unless explicitly described to the contrary, the word "comprise" or "include" and variations, such as "comprises", "comprising", "includes" or "including", will be understood to imply the inclusion of stated constituent elements but not the exclusion of any other constituent elements.

Hereinafter, preferred exemplary embodiments for helping the understanding of the present invention will be suggested. However, the following exemplary embodiments are provided just for more easily understanding the present invention, and the scope of the present invention is not limited by the exemplary embodiments.

<Fuel Cell Stack>

FIG. 1 is a perspective view illustrating a fuel cell stack according to an exemplary embodiment of the present invention, FIG. 2 is a partial cross-sectional view of the cell stack illustrated in FIG. 1, and FIGS. 3A and 3B are top plan views illustrating a window frame and prevention dams according to the exemplary embodiment of the present invention, in which FIG. 3A is a top plan view illustrating a state in which the prevention dams are stacked on upper portions of holes of the window frame, and FIG. 3B is a top plan view illustrating a state in which the prevention dam is separated from the window frame.

A fuel cell stack according to the present invention may include an upper end plate 10, a lower end plate 20, a stack structure 30, alignment pins 40, and prevention dams 50.

The upper and lower end plates 10 and 20 are positioned on upper and lower portions of the stack structure 30 to be described below, respectively, so that uniform pressure may be applied to the stack structure 30.

The lower end plate 20 may have a fuel inlet port and an air inlet port through which fuel and air are supplied to the stack structure 30, and a fuel discharge port and an air discharge port through which waste fuel and waste air, which do not react with the stack structure 30, are discharged. Otherwise, the fuel inlet port and the air inlet port may be formed in the upper end plate 10, and the fuel discharge port and the air discharge port may be formed in the lower end plate 20.

Further, the upper and lower end plates 20 and 30 may have holes in which the alignment pins 40 to be described below are seated, and one or more holes may be formed at edges or corners of the upper and lower end plates 10 and 20.

Further, since the upper and lower end plates 10 and 20 are made by using the existing publicly known technology, a detailed description thereof will be omitted.

The stack structure 30 may be positioned between the upper and lower end plates 10 and 20 and may include one or more end cells (not illustrated).

Here, the end cell may include a unit cell 31, a window frame 32, an air electrode interconnector 33, a fuel electrode interconnector 34, a sealing material 35, and a spacer 36.

First, the unit cell 31 may serve to generate electricity in the fuel cell stack, and includes an electrolyte which has oxygen ion conductivity, and a fuel electrode and an air electrode which are disposed at both sides of the electrolyte, respectively. When fuel is supplied to the fuel electrode, the fuel is oxidized and electrons are discharged through an external circuit, and when oxygen is supplied to the air electrode, the oxygen is reduced to oxygen ions by receiving the electrons from the external circuit. The reduced oxygen ions move to the fuel electrode through the electrolyte, react with the oxidized fuel, and produce water. In this case, direct current electricity is produced as the electrons flow from the fuel electrode to the air electrode.

The window frame 32 serves to prevent oxygen and hydrogen, which are introduced through the air electrode interconnector 33 and the fuel electrode interconnector 34, from being introduced into the unit cell 31, and the window frame 32 serves to prevent oxygen and hydrogen from being mixed with each other during the operation of the fuel cell stack. In addition, flow paths may be formed such that oxygen and hydrogen, which are introduced through the air electrode interconnector 33 and the fuel electrode interconnector 34, may flow in the fuel cell stack.

The interconnectors 33 and 34 may include the air electrode interconnector 33 through which air is supplied, and the fuel electrode interconnector 34 through which fuel is supplied. Further, in the stack structure 30 according to the present invention in which the two or more unit cells 31 are stacked, the interconnectors 33 and 34 may serve to electrically connect the two or more stacked unit cells 31 and may have the flow paths so that the two types of gas, which are supplied to the fuel electrode and the air electrode, may be uniformly supplied to the unit cells 31 without being mixed with each other.

The flow paths formed in the air electrode interconnector 33 and the fuel electrode interconnector 34 may have concave-convex structures and may be formed in any one of upper and lower surfaces of the air electrode interconnector 33 and the fuel electrode interconnector 34. In addition, it is noted that the flow path formed in the air electrode interconnector 33 and the flow path formed in the fuel electrode interconnector 34 are formed to be perpendicular to each other and are not be in communication with each other.

For example, in a case in which an air flow path is formed in a vertical direction, oxygen, which is supplied through the air electrode interconnector 33, may be moved in the vertical direction of the air electrode, and in a case in which a fuel flow path is formed in a horizontal direction, hydrogen, which is supplied through the fuel electrode interconnector 34, may be moved in the horizontal direction of the fuel electrode.

In the fuel cell stack formed by stacking the one or more unit cells 31, the interconnectors 33 and 34 positioned between the unit cells 31 may serve as separators.

The sealing material 35 may be positioned on one or more of the upper and lower portions of the window frame 32. In more detail, the sealing material 35 may be positioned between the edge of the window frame 32 and the interconnectors 33 and 34 and between an inner lower portion of the window frame 32 and the electrolyte. Therefore, the sealing material 35 may serve to join the unit cell 31 to the window frame 32 and may also serve as a shock absorbing member that mitigates impact to be applied to the unit cell 31. The sealing material 35 may be made of any one of glass and crystallized glass and has fluidity at a high temperature. In addition, the sealing material 35 may be provided in the form of a frame like the window frame 32 and may be positioned at the edge of the window frame 32.

The spacer 36 is positioned above a flow path formed inside the window frame 32 and may serve to transmit external pressure, which is applied to the fuel cell stack, to the unit cell 31 and the window frame 32. Further, the spacer 36 may adjust a height of the sealing material 35 positioned between the window frame 32 and the interconnectors 33 and 34. In more detail, the spacer 36 may be provided at a position corresponding to the sealing material 35 positioned between the outside of the window frame 32 and the interconnectors 33 and 34, and the height of the spacer 36 may be equal to or lower than a height of the sealing material 35 after the sealing material 35 is subjected to a heat treatment at a high temperature.

Further, the end cell according to the present invention may further include a current collector, but because the spacer and the current collector are made by using the existing publicly known technology, a detailed description thereof will be omitted.

The alignment pin 40 may serve to align the upper and lower end plates 10 and 20 and the stack structure 30. In more detail, one or more holes are provided at edges or corners of the upper and lower end plates 10 and 20 and the stack structure 30, and the alignment pin 40 is inserted into the hole, such that the upper and lower end plates 10 and 20 and the stack structure 30 may be aligned and fixed so that the upper and lower end plates 10 and 20 and the stack structure 30 are not moved vertically and horizontally.

The alignment pin 40 may have a column shape and have any one shape selected from a group including shapes, in a cross-sectional view and a plan view, having a circular shape, an elliptical shape, a polygonal shape having vertices with curvatures, a triangular shape, a quadrangular shape, a pentagonal shape, and a hexagonal shape. Further, a height of the alignment pin 40 may be equal to or larger than a stack height made by stacking the upper and lower end plates 10 and 20 and the stack structure 30.

In addition, nuts 41 may be further provided at upper and lower portions of the alignment pin 40, respectively. The nuts 41 may serve to prevent the alignment pin 40 from moving vertically. The alignment pin 40 and the nuts 41 may be coupled by a threaded engagement or fitted with one another.

The prevention dam 50 is positioned outside the alignment pin 40 and may serve to prevent the sealing material 35 and the alignment pin 40 from coming into contact with and adhering to each other at a sealing temperature.

The prevention dams 50 may be stacked to be spaced apart from one another in a direction of the height of the alignment pin 40. In this case, the prevention dam 50 may be formed in the stack structure 30 at a position corresponding to the spacer 36, and a height of the prevention dam 50 may be equal to the height of the spacer 36.

In a case in which the height of the prevention dam 50 is larger than the height of the spacer 36, the prevention dam 50 serves as the spacer 36 when compressing the fuel cell stack at the sealing temperature. That is, there may be a problem in that the sealing material 35 is not compressed to have a height equal to or smaller than the height of the prevention dam 50, such that the sealing is not implemented, and a height of the fuel cell stack is increased.

Further, in a case in which the height of the prevention dam 50 is smaller than the height of the spacer 36, there may be a problem in that the sealing material 35, which has fluidity at the sealing temperature, may come into contact with and adhere to the alignment pin 40 through upper and lower sides of the prevention dam 50. In more detail, the sealing material 35, which has fluidity and viscosity at the sealing temperature, may flow in a direction perpendicular to pressure by the pressure loaded to the interconnectors 33 and 34 positioned on the upper portion of the sealing material 35. The sealing material 35, which flows in the direction perpendicular to the pressure, may flow to the upper and lower portions of the prevention dam 50 having the height smaller than the height of the sealing material 35, such that the sealing material 35 may come into contact with and adhere to the alignment pin 40 where no prevention dam 50 is provided.

Further, a cross-sectional area of the prevention dam 50 is larger than a cross-sectional area of the one or more holes formed in the upper and lower end plates 10 and 20 and the stack structure 30, such that the prevention dam 50 may be positioned between the window frame 32 and the interconnectors 33 and 34.

In addition, the prevention dam 50 may have a hollow column shape and have any one shape selected from a group including shapes, in a cross-sectional view and a plan view, having a circular shape, an elliptical shape, a polygonal shape having vertices with curvatures, a triangular shape, a quadrangular shape, a pentagonal shape, and a hexagonal shape. Further, a cross-sectional shape and a planar shape of the prevention dam 50 may be identical to or different from a cross-sectional shape and a planar shape of the alignment pin 40. For example, if the alignment pin 40 has a cylindrical shape, the prevention dam 50 may have a hollow cylindrical shape. Otherwise, if the alignment pin 40 has a quadrangular column shape, the prevention dam 50 may have a hollow cylindrical shape. That is, the shape of the prevention dam 50 is not limited as long as the prevention dam 50 may accommodate the alignment pin 40.

In the fuel cell stack according to the present invention, the unit cell 31 and the window frame 32 do not come into contact with each other, and the portion between the interconnectors 33 and 34 is insulated by the electrolyte of the unit cell 31, and as a result, the window frame 32, the spacer 36, and the air electrode interconnector 33 may be electrically connected. That is, no electrical conduction occurs in the fuel cell stack if the portion between the interconnectors 33 and 34 is insulated. Therefore, the prevention dam 50 according to the present invention may be made of an insulating or non-insulating material.

In the exemplary embodiment, the prevention dam 50 may be made of an insulating material since the prevention dam 50 is positioned between the interconnectors 33 and 34 and the window frame 32 which are made of metal. Therefore, it is noted that the prevention dam 50 may be made of any one of mica and insulating ceramics, or in a case in which the prevention dam 50 is made of metal, the upper and lower portions of the prevention dam 50 are coated with an insulating material.

While the present invention has been described above with reference to the exemplary embodiments, it may be understood by those skilled in the art that the present invention may be variously modified and changed without departing from the spirit and scope of the present invention disclosed in the claims.

The invention claimed is:

1. A fuel cell stack comprising:
   an upper end plate;
   a lower end plate;
   a stack structure which is positioned between the upper and lower end plates and includes one or more end cells which are stacked;
   an alignment pin extending through a hole in the upper end plate, the lower end plate, and the stack structure; and
   a plurality of prevention dams in the hole which are spaced from each other in an axial direction and surround an outer portion of the alignment pin,
   wherein the end cell includes:
   a unit cell;
   a window frame which is positioned at an upper side of the unit cell;
   interconnectors which are positioned at an upper side of the window frame and a lower side of the unit cell;
   a sealing material which is positioned between the unit cell, the window frame, and the interconnectors and bonds the unit cell, the window frame, and the interconnector; and
   a spacer which is positioned at an upper side of the window frame and transmits a load to the sealing material,
   wherein a height of one of the plurality of prevention dams is equal to a height of the spacer.

2. The fuel cell stack of claim 1, wherein a cross-sectional area of each of the plurality of prevention dams is larger than a cross-sectional area of the hole.

3. The fuel cell stack of claim 1, wherein each of the plurality of prevention dams is made of mica or insulating ceramics.

4. The fuel cell stack of claim 1, wherein each of the plurality of prevention dams is made of metal.

5. The fuel cell stack of claim 1, wherein each of the plurality of prevention dams has a hollow column shape.

6. The fuel cell stack of claim 5, wherein each of the plurality of prevention dams has a cross section and a plane having a shape selected from a group consisting of a circular shape, an elliptical shape, a polygonal shape having vertices with curvatures, a triangular shape, a quadrangular shape, a pentagonal shape, and a hexagonal shape.

7. The fuel cell stack of claim 1, wherein each of the plurality of prevention dams has an inner surface contacting the alignment pin, an outer surface, an upper surface extending between the inner surface and outer surface and a lower surface extending between the inner surface and outer surface.

8. The fuel cell stack of claim 1, further comprising a plurality of spacers in the stack structure, wherein each of the plurality of prevention dams is aligned with one of the plurality of spacers.

* * * * *